(12) United States Patent
Alkhafaji

(10) Patent No.: US 11,572,695 B2
(45) Date of Patent: Feb. 7, 2023

(54) METHOD FOR BENDING A VINYL FLOOR PLANK TO FORM A STAIR NOSE PLANK

(71) Applicant: Asaad Alkhafaji, Port Charlotte, FL (US)

(72) Inventor: Asaad Alkhafaji, Port Charlotte, FL (US)

(*) Notice: Subject to any disclaimer, the term of this patent is extended or adjusted under 35 U.S.C. 154(b) by 218 days.

(21) Appl. No.: 17/139,411

(22) Filed: Dec. 31, 2020

(65) Prior Publication Data

US 2022/0205248 A1    Jun. 30, 2022

(51) Int. Cl.

| | | |
|---|---|---|
| *E04F 11/16* | (2006.01) | |
| *B29C 53/40* | (2006.01) | |
| *E04F 11/104* | (2006.01) | |
| *E04F 15/02* | (2006.01) | |
| *B29C 53/04* | (2006.01) | |
| *E04F 15/10* | (2006.01) | |
| *B29L 31/00* | (2006.01) | |
| *B29K 27/06* | (2006.01) | |

(52) U.S. Cl.
CPC ............ *E04F 11/163* (2013.01); *B29C 53/04* (2013.01); *B29C 53/40* (2013.01); *E04F 11/1043* (2013.01); *E04F 15/02038* (2013.01); *E04F 15/105* (2013.01); *B29K 2027/06* (2013.01); *B29L 2031/732* (2013.01)

(58) Field of Classification Search
CPC ................. E04F 11/163; E04F 11/1043; E04F 15/02038; E04F 15/105; B29C 53/04; B29C 53/40; B29C 51/42; B29C 51/428; B29K 2027/06; B29L 2031/732; B29L 2007/002; B29D 99/0057; B44B 5/028
See application file for complete search history.

(56) References Cited

U.S. PATENT DOCUMENTS 3,028,628 A * 4/1962 Rutherford ............. B29C 53/04
                                                        425/193
4,058,942 A * 11/1977 Naka ..................... E04F 11/163
                                                        428/167

(Continued)

FOREIGN PATENT DOCUMENTS

CA           3054705 A1 * 3/2012 ............. B29C 70/52
CN        102438800 A  * 5/2012 ............. B26D 3/006

*Primary Examiner* — Brent W Herring
(74) *Attorney, Agent, or Firm* — John R. Ross; John R. Ross, III

(57) ABSTRACT

A method for bending a vinyl floor plank to form a stair nose plank. A first bending gap is established between two blending blocks and a second bend gap is established between two second bending blocks. Heat is applied to a vinyl floor plank along a first bend location. The vinyl floor plank is then placed into the first bend gap. A user presses downward on the vinyl floor plank to form a first right angle bend. Heat is applied to a vinyl floor plank along a second bend location. The vinyl floor plank is then placed into the second bend gap. The user presses downward on the vinyl floor plank to form a second right angle bend. The first right angle bend and the second right angle bend combine to form a U-shaped bend to form a stair nose plank. In a preferred embodiment the stair nose plank includes a locking mechanism along its edges. In a preferred embodiment heat is applied by utilization of an acrylic bending machine.

5 Claims, 7 Drawing Sheets

(56) References Cited

U.S. PATENT DOCUMENTS

| | | | | |
|---|---|---|---|---|
| 4,060,947 | A | * | 12/1977 | Naka ............... E04F 11/166 |
| | | | | 52/179 |
| 4,077,825 | A | * | 3/1978 | Naka ............... E04F 11/166 |
| | | | | 156/289 |
| 4,093,499 | A | * | 6/1978 | Naka ............... B29C 48/08 |
| | | | | 156/499 |
| 4,151,320 | A | * | 4/1979 | Naka ............... A47G 27/06 |
| | | | | 428/167 |
| 2014/0245681 | A1 | * | 9/2014 | Carrubba ......... E04F 13/0894 |
| | | | | 52/404.4 |
| 2020/0346482 | A1 | * | 11/2020 | Mendez ............ B29C 51/422 |
| 2021/0010272 | A1 | * | 1/2021 | Bodendorf ........ E04F 11/1045 |
| 2021/0381244 | A1 | * | 12/2021 | Iannacone, III ... E04F 11/163 |
| 2022/0213690 | A1 | * | 7/2022 | Iannacone, III ... E04F 11/17 |

* cited by examiner

METHOD FOR BENDING A VINYL FLOOR PLANK TO FORM A STAIR NOSE PLANK

BACKGROUND OF THE INVENTION

Vinyl plank flooring is known in the prior art. FIG. 1 shows a top view of vinyl flooring plank 1. Popular vinyl planks include luxury vinyl tile flooring (LVT), luxury vinyl plank flooring (LVP), stone plastic composite vinyl flooring (SPC), and other acrylic or vinyl type floorings. Vinyl planks varies in size, with most widths ranging from 6 inches up to 7¾ inches but varying between 5 inches and 8 inches and typical lengths ranging from 36 to 48 inches. Vinyl planks range in thickness from 2 mm for lower quality products to 8 mm or more for higher quality products. This measurement varies since luxury vinyl tile is comprised of four-to-five different distinct layers that include a urethane coating, the wear layer, a print film layer, the vinyl core, and the backing. Vinyl planks typically include locking mechanism 2 that surrounds the planks and is for click locking adjacent planks together. FIG. 2 shows tongue 3 and groove 4 of locking mechanism 2.

Acrylic bending machines are known in the prior art. FIG. 3 shows acrylic bending machine 5. Acrylic bending machine 5 (model no. ABM700/1300) is available from Aecfun Commercial Equipment Co., Ltd of Jiaxing, China. Acrylic bending machine 5 is a useful tool for softening and bending acrylic, organic glass, plexiglass, and polyvinyl chloride (PVC) into shapes. Acrylic bending machine 5 may be used for sign making, display cases, artware making, and other applications. Acrylic bending machine 5 uses an infrared tube (not shown) for heating. The temperature is adjustable according to the different thickness of the plastic sheet being bent with a maximum temperature of 600° C. Acrylic bending machine 5 includes an adjustable heating gap 6 where the gap width is adjustable between 0-20 mm, according to the needs of the user. The horizontal position of the plastic sheet being bent over heating gap 6 is adjustable by manipulating adjustable arm 50.

Vinyl plank flooring is very popular. Unfortunately, however, prior art stair nose pieces must be specially ordered, are expensive, difficult to work with and do not include locking mechanisms for click locking the stair nose plank to other vinyl planks.

What is needed is an improved method for fabricating vinyl plank stair nose pieces.

SUMMARY OF THE INVENTION

The present invention provides a method for bending a vinyl floor plank to form a stair nose plank. A first bending gap is established between two blending blocks and a second bend gap is established between two second bending blocks. Heat is applied to a vinyl floor plank along a first bend location. The vinyl floor plank is then placed into the first bend gap. A user presses downward on the vinyl floor plank to form a first right angle bend. Heat is applied to a vinyl floor plank along a second bend location. The vinyl floor plank is then placed into the second bend gap. The user presses downward on the vinyl floor plank to form a second right angle bend. The first right angle bend and the second right angle bend combine to form a U-shaped bend to form a stair nose plank. In a preferred embodiment the stair nose plank includes a locking mechanism along its edges. In a preferred embodiment heat is applied by utilization of an acrylic bending machine.

DETAILED DESCRIPTION OF THE PREFERRED EMBODIMENTS

Utilization of the Preferred Embodiments

Figure 1:
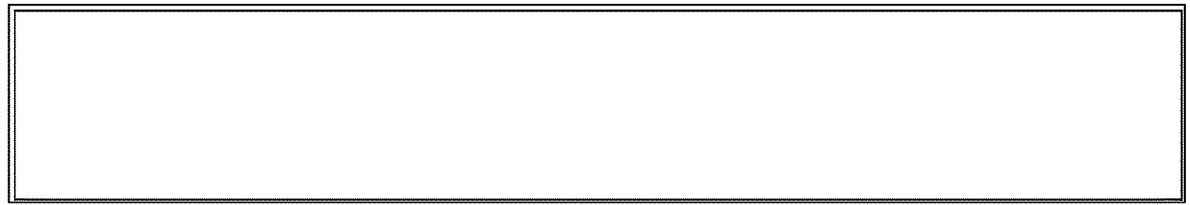
FIGS. 1-2 show a prior art vinyl floor plank.
Figure 2:
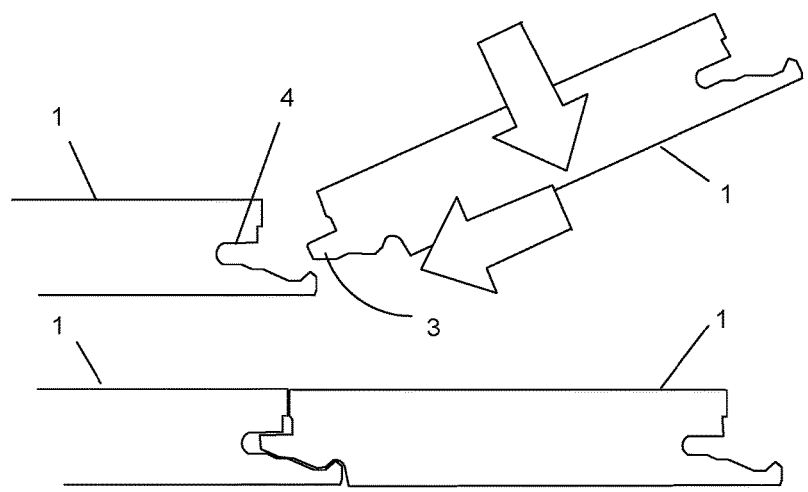
Figure 3:
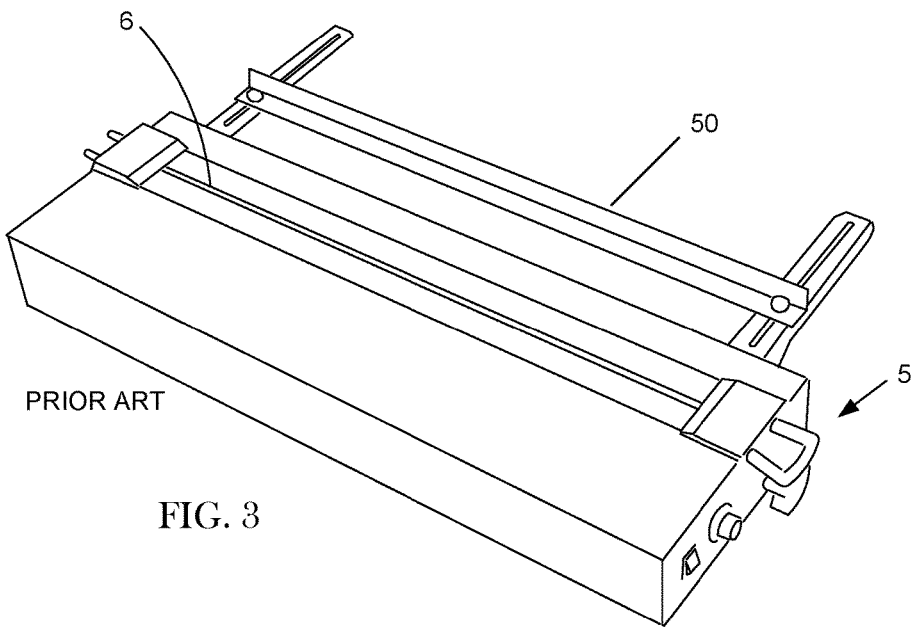
FIG. 3 shows a prior art acrylic bending machine.
Figure 4:
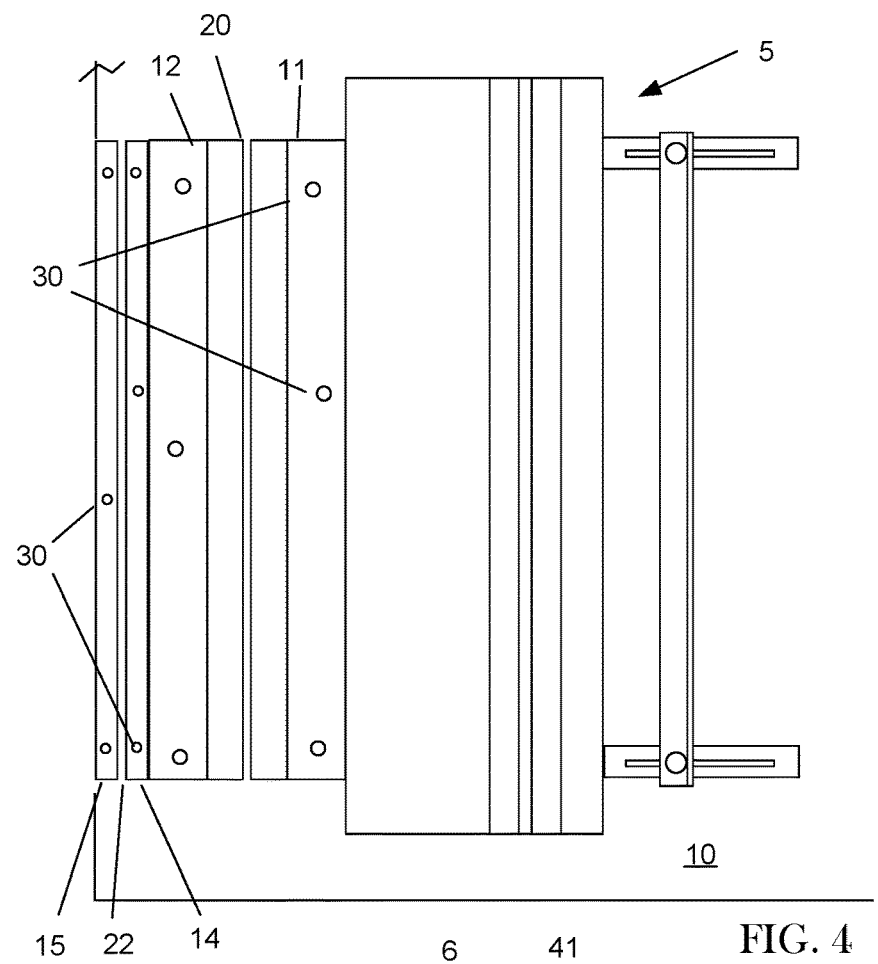
FIGS. 4-14 show a preferred method for bending a vinyl flooring plank to form a stair nose plank.

FIG. 4 shows a top view of acrylic bending machine 5 positioned on the top of table 10. First bending blocks 11 and 12 are bolted via bolts 30 to table 10 as shown. Second bending blocks 14 and 15 are likewise bolted via bolts 30 to table 10. Bending blocks 11 and 12 are separated by bending gap 20 and bending blocks 14 and 15 are separated by bending gap 22.

Figure 5:
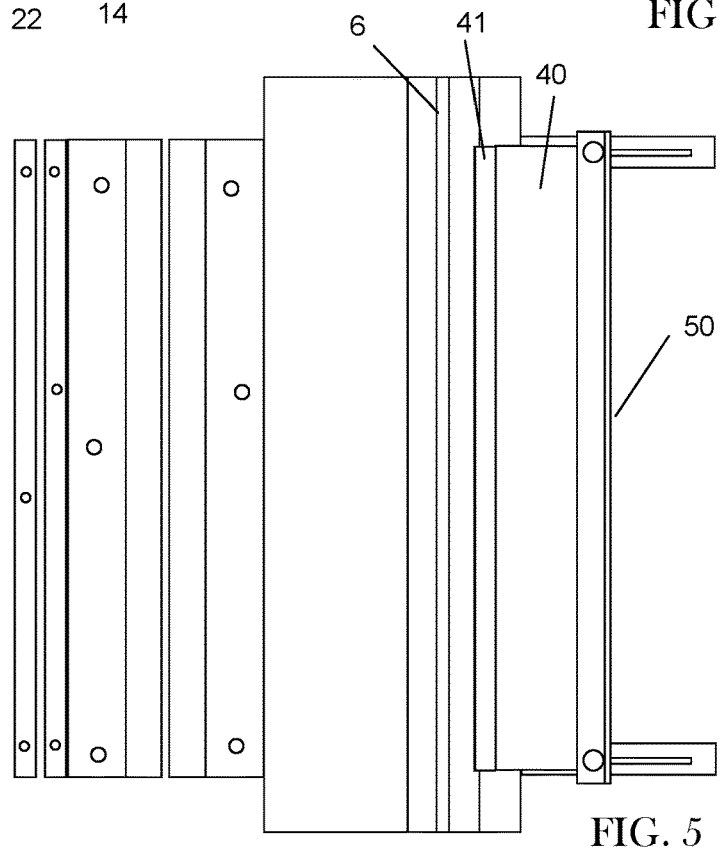

In FIG. 5, user has placed spacer block 40 and spacer block 41 next to adjustable support arm 50. Spacer blocks 40 and 41 and support arm 50 function to properly horizontally position a flooring plank over heating gap 6. In one preferred embodiment, heating gap 6 has been adjusted so that the gap measures approximately 10 mm. Also, in one preferred embodiment the heating tube has been adjusted so that the heat applied through heating gap 6 is approximately 425° C.

Figure 6:
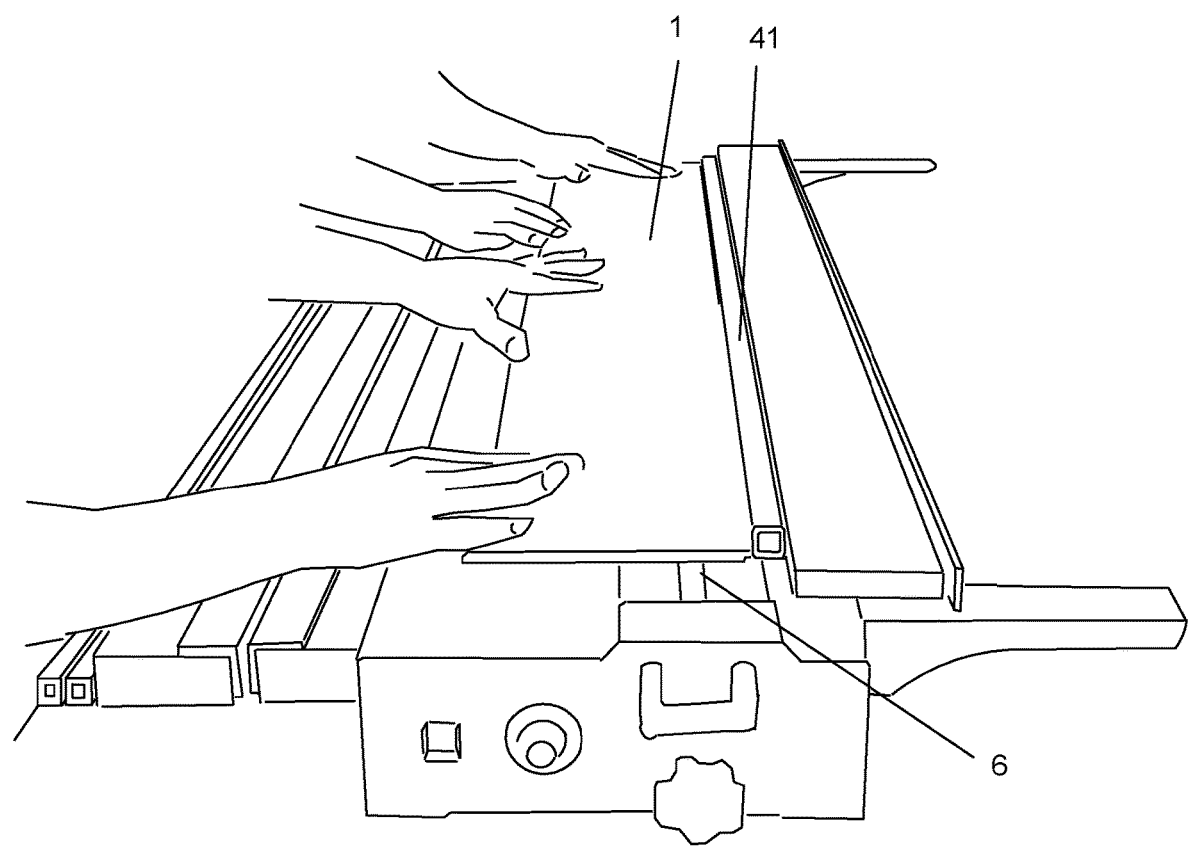
Figure 7:
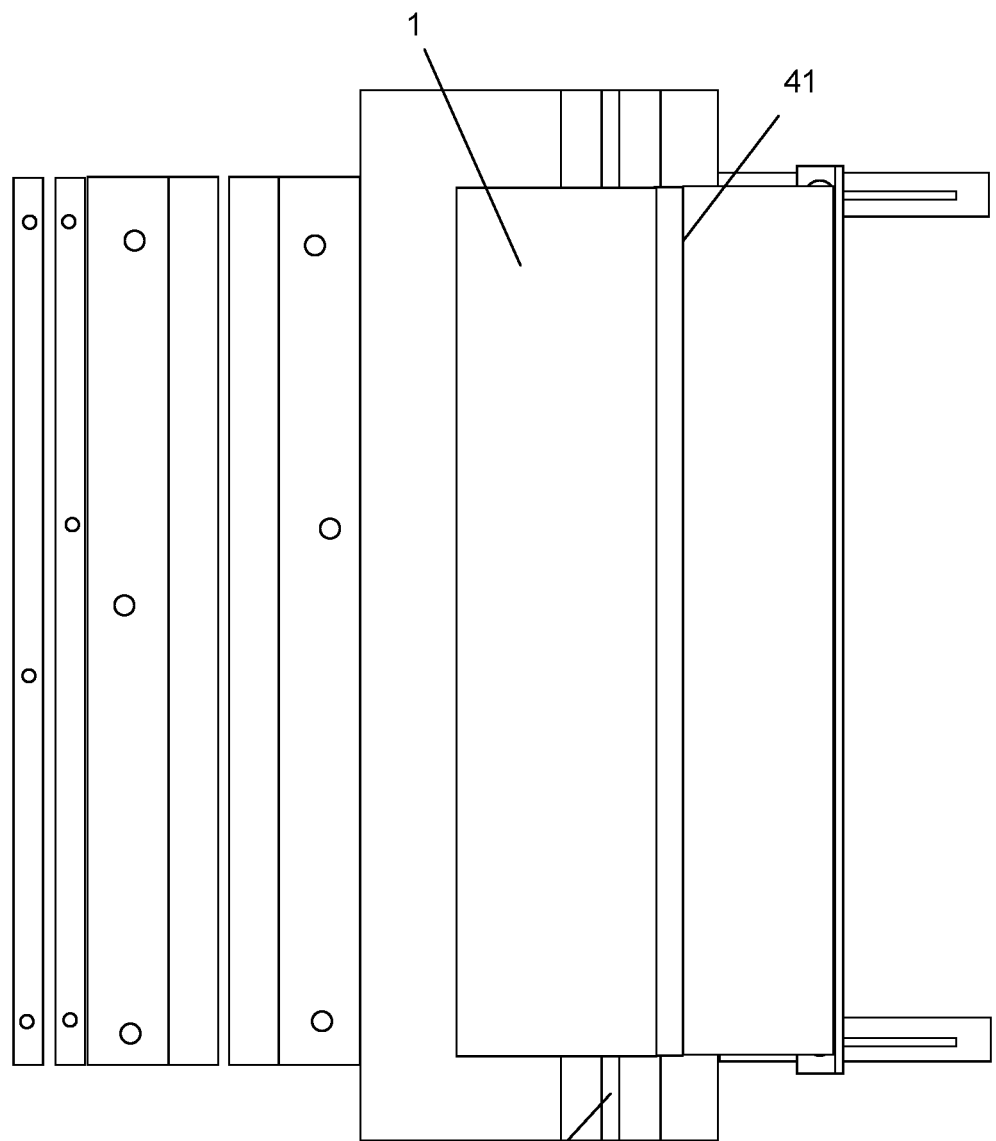
Figure 8:
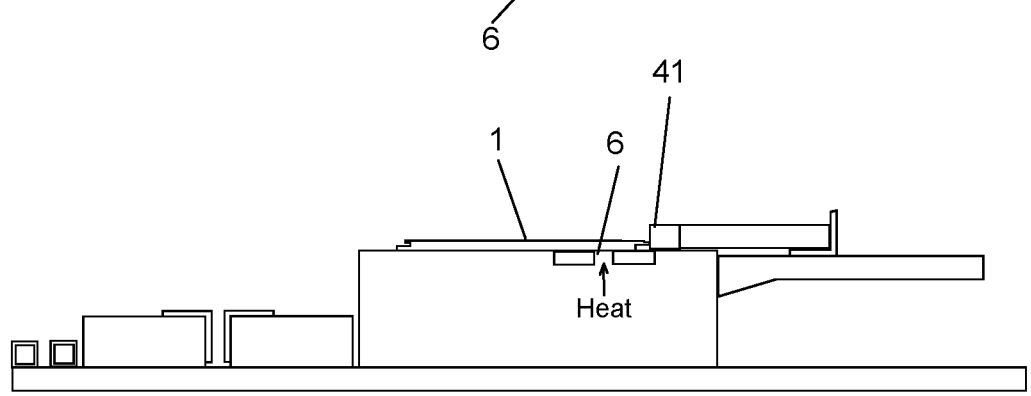

In FIGS. 6-8, the user has placed plank 1 against over heating gap 6 and adjacent to spacer block 41. Plank 1 is a vinyl plank having a thickness of approximately 5 mm. In a preferred embodiment, the user holds plank 1 over heating gap 6 for approximately 50 seconds.

Figure 9:
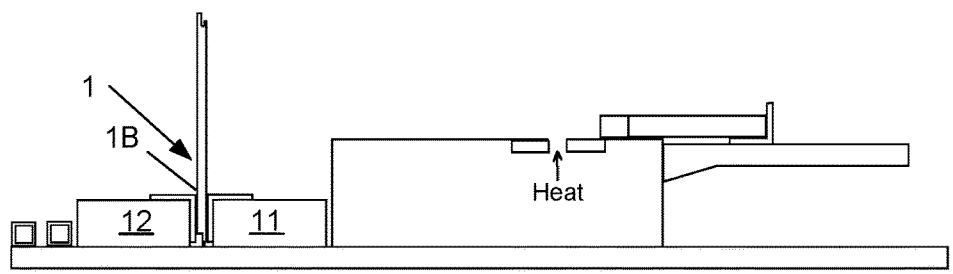

In FIG. 9, the user has placed plank 1 in bending gap 20 so that heated area 1B is located near the top of bending blocks 12 and 11.

Figure 10:
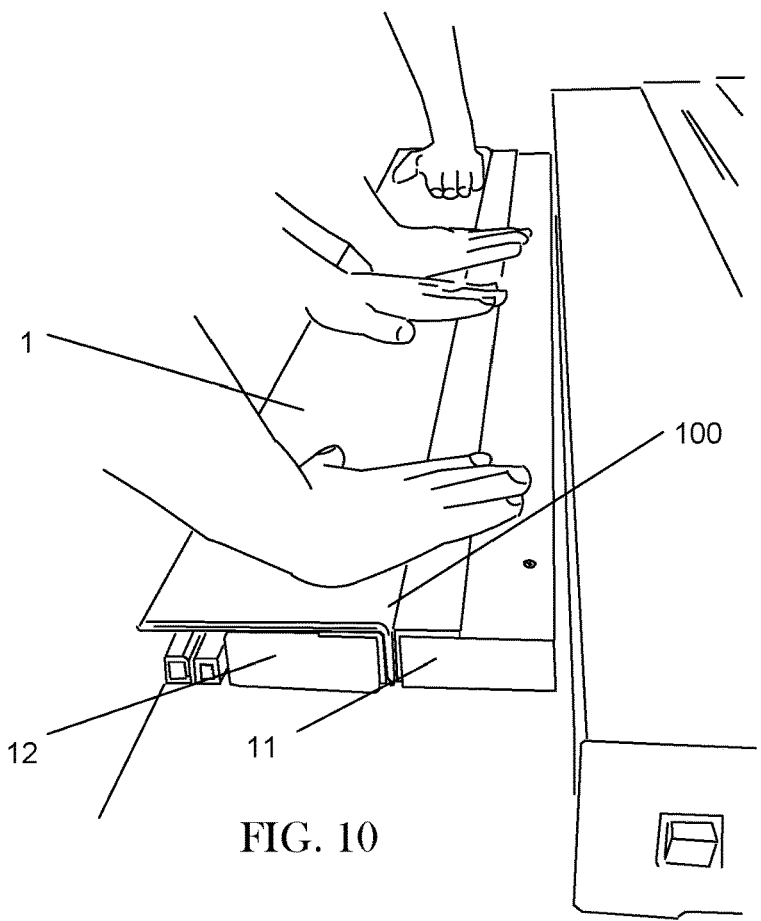
Figure 11:
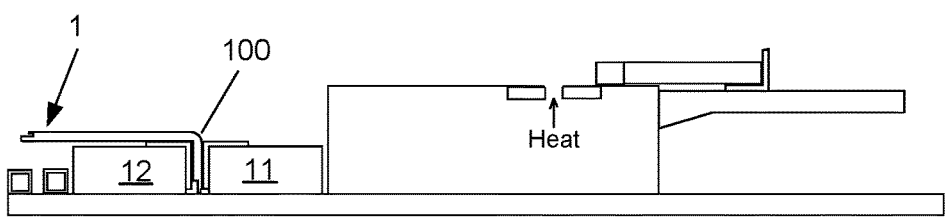

In FIGS. 10 and 11, the user has pressed down on plank 1 as shown so that first right angle bend 100 is formed in plank 1. The user holds plank 1 down in the position shown in FIGS. 10 and 11 for approximately 50 seconds while bend 100 cools to hold rigid its shape at the right angle.

Figure 12:
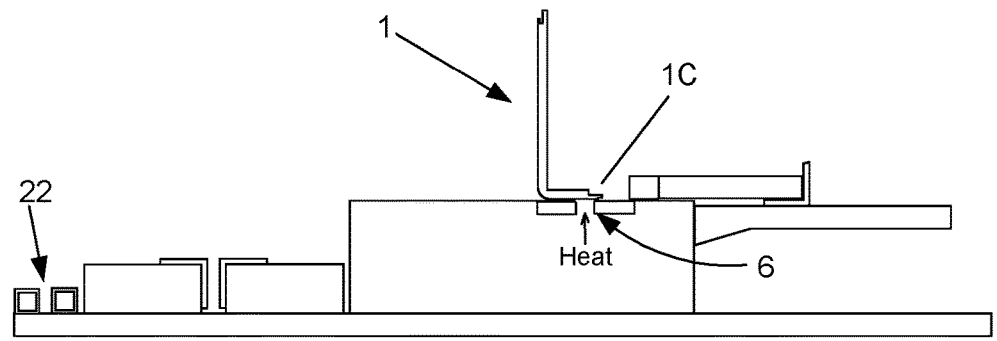

In FIG. 12, the user has placed bent plank 1 over heat gap 6 as shown to heat plank 1 at location 1C. In a preferred embodiment, the user holds plank 1 over heating gap 6 for approximately 50 seconds.

Figure 13:
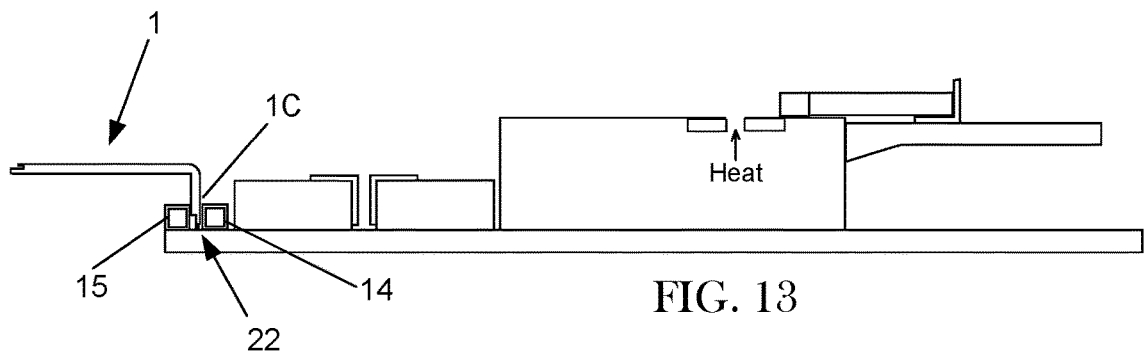

In FIG. 13, the user has placed plank 1 in bending gap 20 so that heated area 1C is located near the top of bending blocks 15 and 14.

Figure 14:
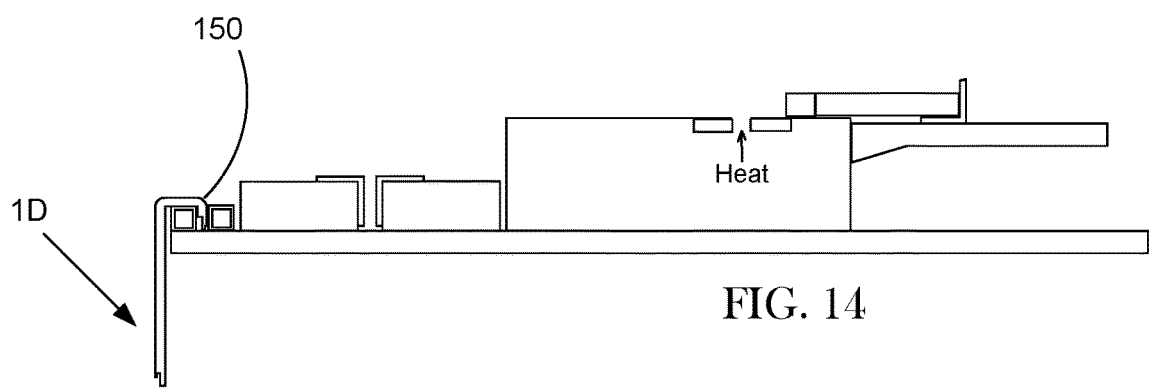

In FIG. 14, the user has pressed down on plank 1 as shown so that second right angle bend 150 is formed, thereby forming bent plank 1D. The user holds plank 1D down in the position shown in FIG. 14 for approximately 50 seconds while bend 150 cools to hold rigid its shape at the right angle.

Figure 15:
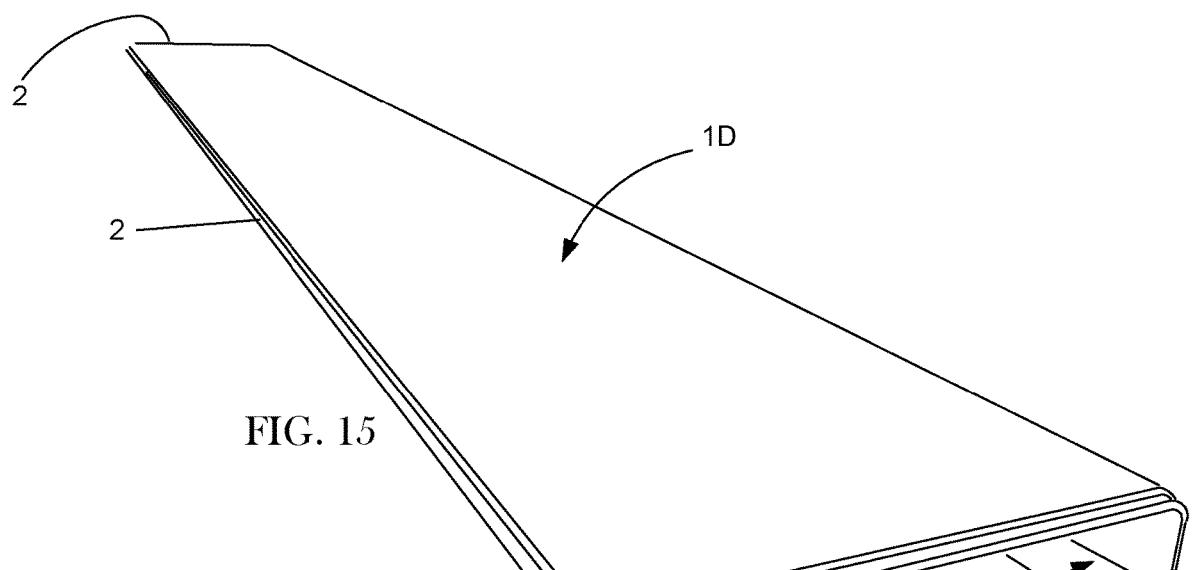
FIG. 15 shows a perspective view of a preferred stair nose plank.
Figure 16:
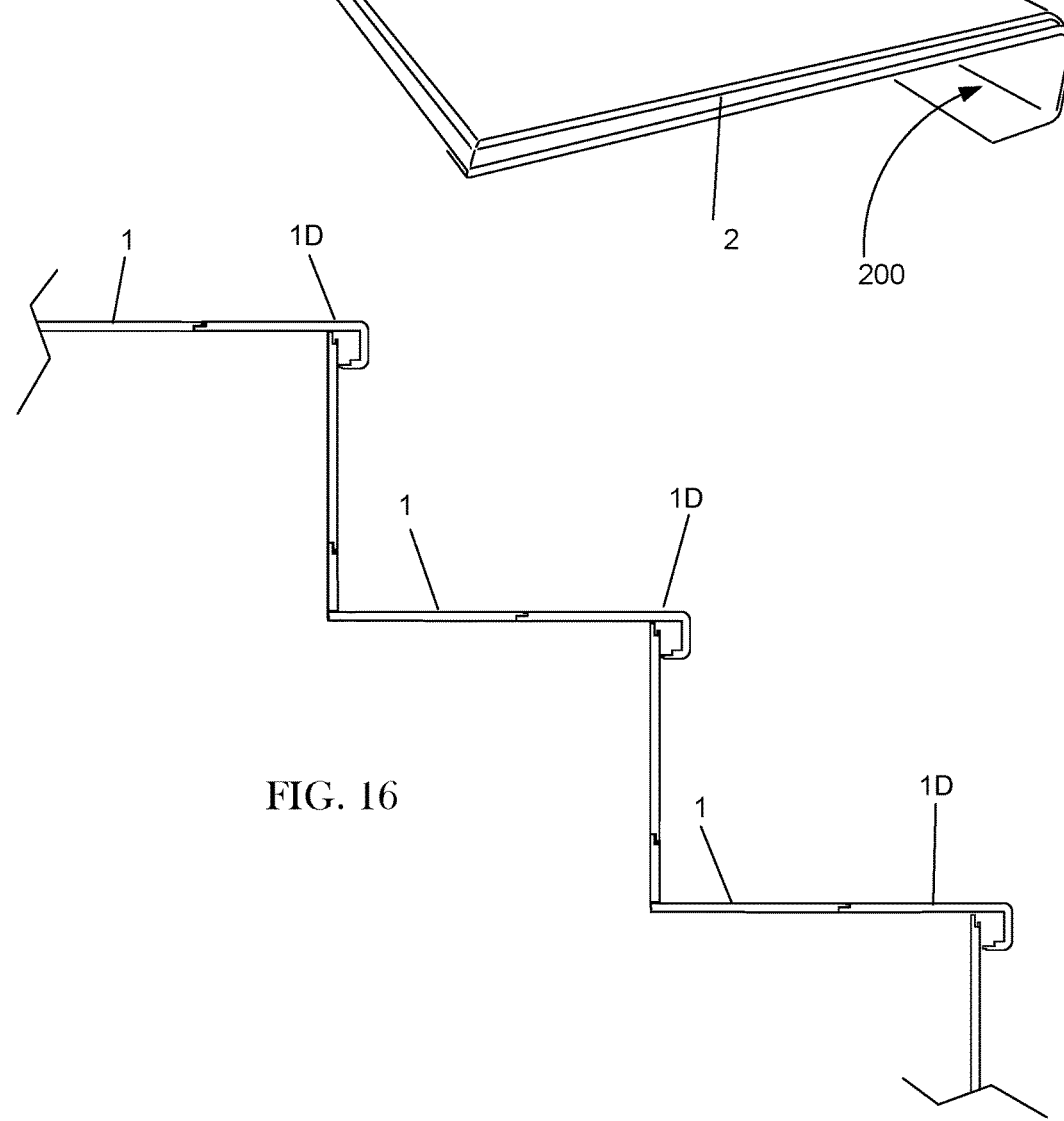
FIG. 16 shows preferred stair nose planks installed on steps.

FIG. 15 shows a perspective view of bent plank 1D having U-shaped bend 200 to form a stair nose piece. It should be noted that plank 1D includes locking mechanism 2 for easy, efficient and secure installation. For example, FIG. 16 shows multiple stair nose planks 1D installed on stairs and locked to non-bent planks 1.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:

1. A method for bending a vinyl floor plank to form a bent stair nose plank, said method comprising the steps of:
   A. establishing a first bend gap between two first bending blocks,
   B. establishing a second bend gap between two second bending blocks,
   C. applying heat to a vinyl floor plank along a first bend location,
   D. placing said vinyl floor plank into said first bend gap,
   E. pressing downward on said vinyl floor plank to form a first right angle bend,
   F. applying heat to a vinyl floor plank along a second bend location,
   G. placing said vinyl floor plank into said second bend gap,
   H. pressing downward on said vinyl floor plank to form a second right angle bend, wherein said first right angle bend and said second right angle bend combine to form a U-shaped bend to form said stair nose plank.

2. The method as in claim 1, wherein said heat is applied to said vinyl floor plank by utilization of an acrylic bending machine.

3. The method as in claim 1, wherein said two first bending blocks are rigidly attached to a table.

4. The method as in claim 1, wherein said two second bending blocks are rigidly attached to a table.

5. The method as in claim 1, wherein said stair nose plank comprises a locking mechanism along the edge of said stair nose plank.

* * * * *